United States Patent
Ohno et al.

(10) Patent No.: US 10,220,473 B2
(45) Date of Patent: Mar. 5, 2019

(54) PROCESSING NOZZLE AND OPTICAL MACHINING APPARATUS

(71) Applicant: TECHNOLOGY RESEARCH ASSOCIATION FOR FUTURE ADDITIVE MANUFACTURING, Tokyo (JP)

(72) Inventors: Hiroshi Ohno, Kanagawa (JP); Mitsuo Sasaki, Kanagawa (JP); Yuji Sasaki, Kanagawa (JP); Satoshi Tsuno, Kanagawa (JP); Go Obara, Kanagawa (JP); Tomohiko Yamada, Kanagawa (JP); Yasutomo Shiomi, Kanagawa (JP); Takashi Obara, Kanagawa (JP)

(73) Assignee: Technology Research Association for Future Additive Manufacturing, Tokyo (JP)

( * ) Notice: Subject to any disclaimer, the term of this patent is extended or adjusted under 35 U.S.C. 154(b) by 41 days.

(21) Appl. No.: 15/120,062

(22) PCT Filed: Nov. 11, 2015

(86) PCT No.: PCT/JP2015/081727
§ 371 (c)(1),
(2) Date: Aug. 18, 2016

(87) PCT Pub. No.: WO2017/081767
PCT Pub. Date: May 18, 2017

(65) Prior Publication Data
US 2017/0259378 A1 Sep. 14, 2017

(51) Int. Cl.
*B23K 26/14* (2014.01)
*B23K 26/144* (2014.01)
(Continued)

(52) U.S. Cl.
CPC ...... *B23K 26/1476* (2013.01); *B05C 11/1036* (2013.01); *B23K 26/144* (2015.10);
(Continued)

(58) Field of Classification Search
CPC .. B23K 26/14; B23K 26/1464; B23K 26/147; B23K 26/1476; B23K 26/144;
(Continued)

(56) References Cited

U.S. PATENT DOCUMENTS

| 555,573 A * | 3/1896 | Haas | B05B 1/1609 239/441 |
| 6,817,553 B2 * | 11/2004 | Steur | B05B 1/1627 239/223 |

(Continued)

FOREIGN PATENT DOCUMENTS

| JP | 2-78458 A | 3/1990 |
| JP | 2012-125772 A | 7/2012 |

OTHER PUBLICATIONS

International Search Report (ISR) dated Feb. 16, 2016 for International Application No. PCT/JP2015/081727.
(Continued)

*Primary Examiner* — Christopher Kim
(74) *Attorney, Agent, or Firm* — Ladas & Parry LLP (57) ABSTRACT

Ejection and stop of a powder flow are switched while maintaining a once generated steady flow without stopping it. A processing nozzle includes a supply source of a fluid containing a powder, a first channel through which the fluid supplied from the supply source passes, a second channel that supplies the fluid to an ejection port of the nozzle, a third channel that releases the fluid outside the nozzle, and a switch that causes the first channel and the second channel to communicate with each other when supplying the fluid to the ejection port, and causes the first channel and the third
(Continued)

channel to communicate with each other when not supplying the fluid to the ejection port.

11 Claims, 11 Drawing Sheets

(51) Int. Cl.
*B33Y 30/00* (2015.01)
*B33Y 40/00* (2015.01)
*B23K 26/342* (2014.01)
*B05C 11/10* (2006.01)
*B29C 64/209* (2017.01)

(52) U.S. Cl.
CPC ...... *B23K 26/1435* (2013.01); *B23K 26/1438* (2015.10); *B23K 26/1462* (2015.10); *B23K 26/342* (2015.10); *B29C 64/209* (2017.08); *B33Y 30/00* (2014.12); *B33Y 40/00* (2014.12)

(58) Field of Classification Search
CPC .............. B23K 26/342; B23K 26/1435; B23K 26/1462; B23K 26/1438; B33Y 30/00; B33Y 40/00; B05C 11/1036; B29C 64/209; B05B 1/1645; B05B 1/1654
USPC ....... 219/121.84, 121.63; 239/390–397, 442, 239/447, 581.1
See application file for complete search history.

(56) References Cited

U.S. PATENT DOCUMENTS

| | | |
|---|---|---|
| 7,223,935 B2 | 5/2007 | Wessner |
| 2012/0145683 A1 | 6/2012 | Miyagi et al. |
| 2016/0015020 A1* | 1/2016 | Needham ............ A01M 7/0089 239/159 |

OTHER PUBLICATIONS

Written Opinion (WO) dated Feb. 16, 2016 for International Application No. PCT/JP2015/081727.
J-PlatPat English abstract of JP 2012-125772 A.
J-PlatPat English abstract of JP 2-78458 A.

* cited by examiner

POWDER FLOW NON-EJECTION

POWDER FLOW A EJECTION

F I G. 5B

POWDER FLOW B EJECTION

PROCESSING NOZZLE AND OPTICAL MACHINING APPARATUS

RELATED APPLICATION

This application is an application under 35 U.S.C. 371 of International Application No. PCT/JP2015/081727 filed on Nov. 11, 2015, the entire contents of which are incorporated herein by reference.

TECHNICAL FIELD

The present invention relates to a processing nozzle for ejecting a fluid containing a processing material to a processing point in an optical machining apparatus which forms a shaped object by irradiating the fluid with light.

BACKGROUND ART

In the abovementioned technical field, patent literature 1 has disclosed a technique of switching ejection and stop of a powder flow from a nozzle by stopping the flowing of the powder flow.

CITATION LIST

Patent Literature

Patent literature 1: U.S. Pat. No. 7,223,935

SUMMARY OF THE INVENTION

Technical Problem

In this technique described in the abovementioned literature, however, a once generated steady flow must be stopped when switching ejection and stop of the powder flow from the nozzle, i.e., it is impossible to switch ejection and stop of the powder flow while maintaining the steady flow.

The present invention enables to provide a technique of solving the above-described problem.

Solution to Problem

One aspect of the present invention provides a processing nozzle comprising:
a supply source of a fluid containing a powder;
a first channel through which the fluid supplied from the supply source passes;
a second channel that supplies the fluid to an ejection port of the nozzle;
a third channel that releases the fluid outside the nozzle; and
a switch that causes the first channel and the second channel to communicate with each other when supplying the fluid to the ejection port, and causes the first channel and the third channel to communicate with each other when not supplying the fluid to the ejection port.

Another aspect of the present invention provides an optical machining apparatus using the abovementioned processing nozzle.

Advantageous Effects of Invention

According to the present invention, ejection and stop of a powder flow can be switched while maintaining a once generated steady flow without stopping it.

DESCRIPTION OF THE EMBODIMENTS

Embodiments of the present invention will exemplarily be explained in detail below with reference to the accompanying drawings. Note that the arrangements, numerical values, procedures, functional elements, and the like described in the following embodiments are merely examples, are freely modifiable or changeable, and are not intended to limit the technical scope of the present invention to the following description.

First Embodiment

Figure 1:
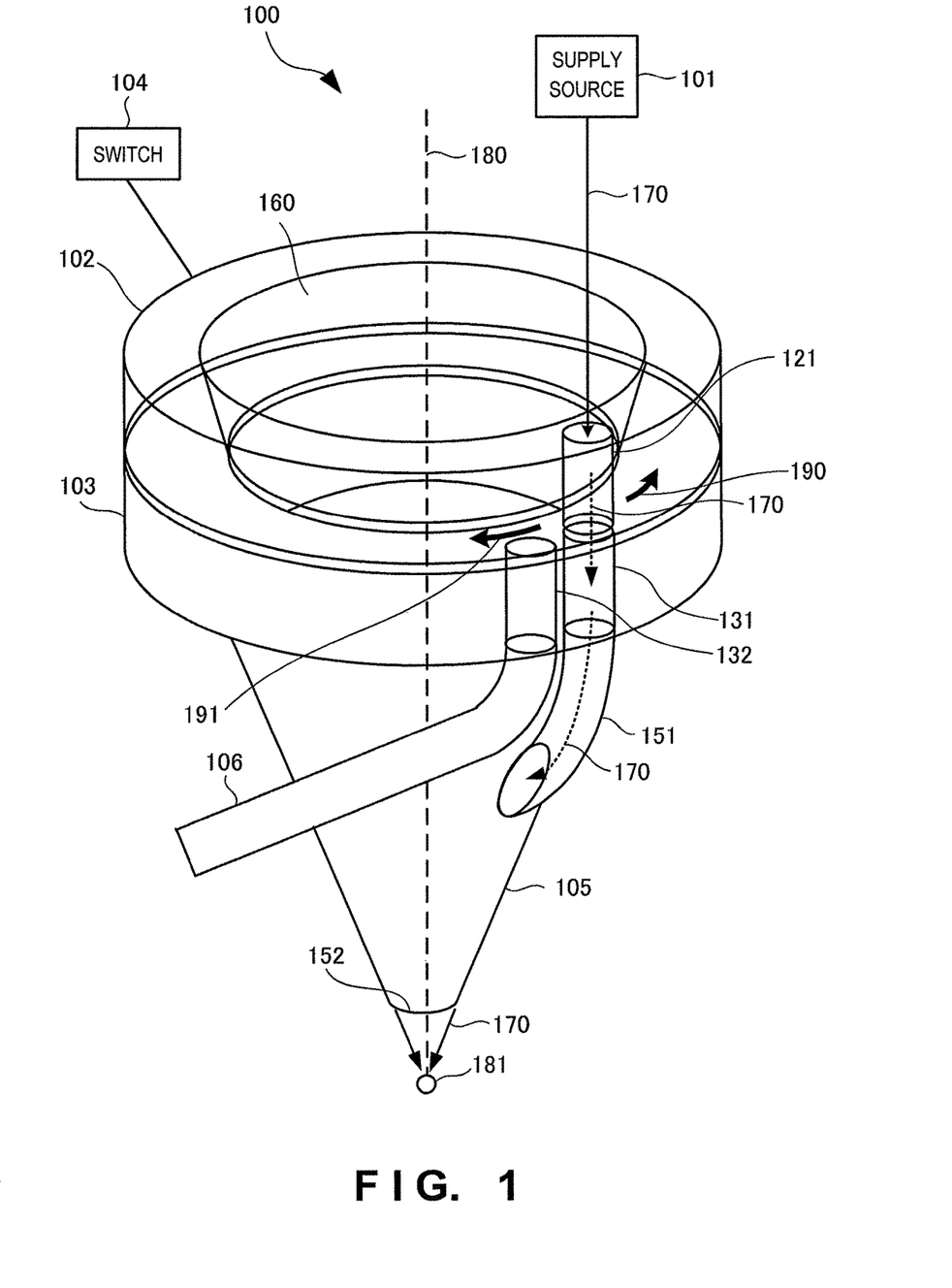
FIG. 1 is a schematic perspective view showing the arrangement of a processing nozzle according to the first embodiment of the present invention, and shows a case in which a powder flow is supplied to a processing point.
Figure 2:
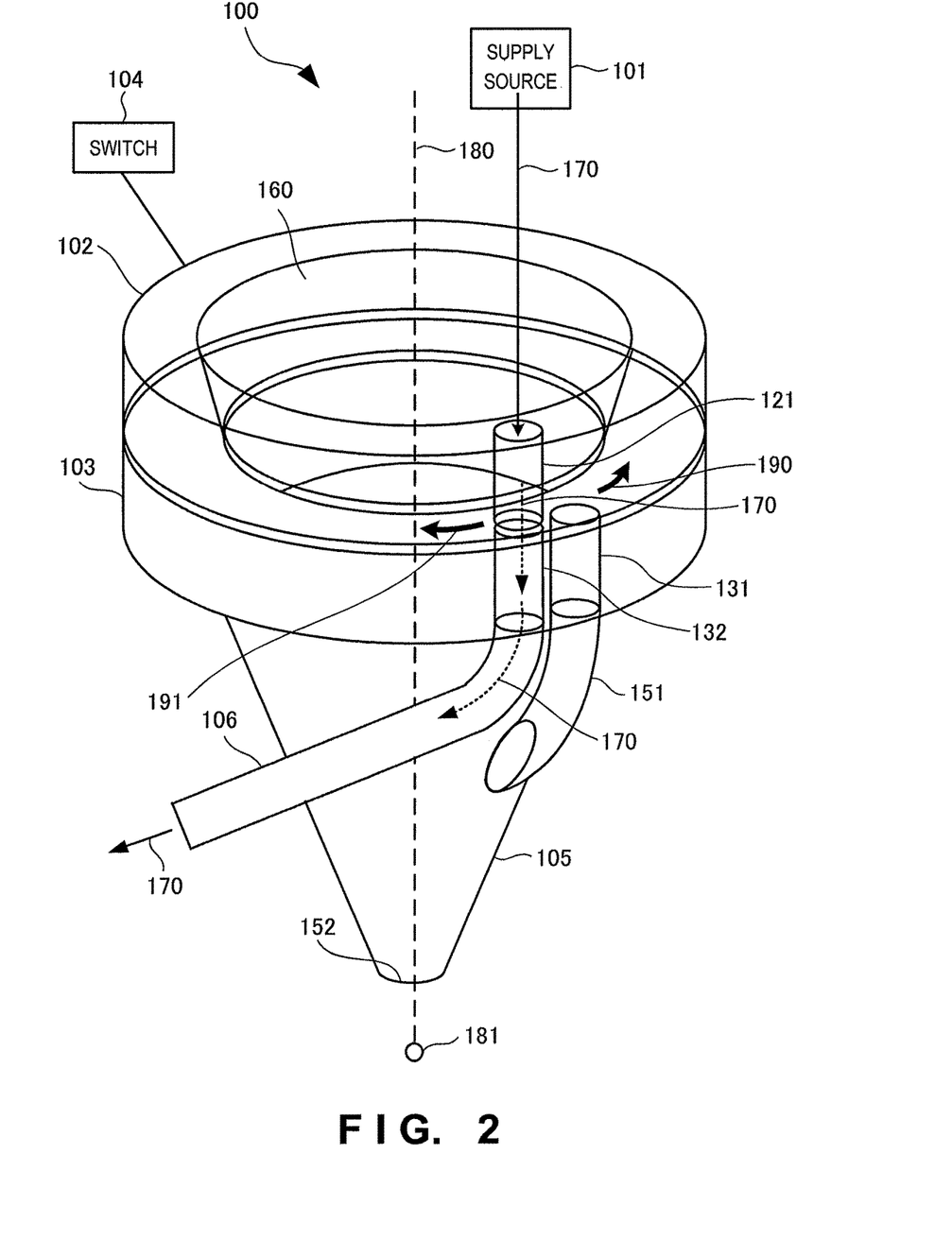
FIG. 2 is a schematic perspective view showing the arrangement of the processing nozzle according to the first embodiment of the present invention, and shows a case in which the powder flow is not supplied to the processing point.

A processing nozzle 100 as the first embodiment of the present invention will be explained with reference to FIGS. 1 and 2. FIG. 1 is a schematic perspective view showing the arrangement of the processing nozzle 100 according to this embodiment, and shows a case in which a powder flow is supplied to a processing point. FIG. 2 is a schematic perspective view showing the arrangement of the processing nozzle 100 according to this embodiment, and shows a case in which the powder flow is not supplied to the processing point.

The processing nozzle 100 is a member which is attached to the distal end portion of an optical machining apparatus, and supplies a powder flow 170 containing a powder as a material of a three-dimensional shaped object or the like to a processing point 181. The optical machining apparatus to which the processing nozzle 100 is attached melts the powder contained in the powder flow 170 supplied to the processing point 181 by condensing light to the processing point 181, thereby forming a three-dimensional shaped object or performing overlay welding.

As shown in FIG. 1, the processing nozzle 100 includes a supply source 101, a part 102, a part 103, a switch 104, a nozzle cone 105, and a collection path 106. The part 102 has a channel 121 (a first channel), the part 103 has a channel 131 (a second channel) and a channel 132 (a third channel), and the nozzle cone 105 has a channel 151 and an ejection port 152. A channel herein mentioned is a member in which a gap or vacancy through which a fluid flows is formed. This member can be a metal or resin, but the material is not limited to this. Also, a fluid is a substance having flowability such as a gas or liquid, or a mixture of a gas or liquid and a material. The powder flow 170 is a fluid.

The supply source 101 supplies the powder flow 170 containing a powder as a material of a three-dimensional shaped object or the like to the processing nozzle 100. The powder flow 170 is obtained by mixing a metal powder in an inert gas (a rare gas such as argon, helium, or nitrogen).

A light beam is emitted from an optical system (not shown), and condensed, through a beam path 160, to the processing point 181 or a region having a predetermined area including the processing point 181. An inert gas (a rare gas such as argon, helium, or nitrogen) is also supplied to the beam path 160, thereby preventing oxidation of the processing point 181, and preventing a foreign body such as fume scattered from the processing point 181 from entering the processing nozzle 100.

The switch 104 switches communication destination channels of the channel 121 by moving the part 102 in arrow directions (190 and 191) shown in FIGS. 1 and 2. That is, when supplying the powder flow 170 to the processing point 181, the switch 104 moves the part 102 such that the channels 121 and 131 communicate with each other. By contrast, when supplying no powder flow to the processing point 181, the switch 104 moves the part 102 so that the channels 121 and 132 communicate with each other.

By thus controlling the movement of the part 102 by using the switch 104, the parts 102 and 103 can change their relative positions. That is, the part 102 can be rotated clockwise or counterclockwise around a central axis 180 as a rotation axis. By thus rotating the part 102, the user of the optical machining apparatus can properly select supply or non-supply of the powder flow 170.

The channel 132 can directly be open to the outside, but can also be connected to a collection pod (not shown) via the collection path 106. When the powder contained in the powder flow 170 is collected in the collection pod, the collected powder can be reused. On the other hand, when the channel 132 is directly open to the outside, the efficiency of powder utilization decreases, but the whole apparatus can be made compact because neither the collection path 106 nor the collection pod is necessary.

Let $R_1$ be the channel resistance of a path extending from the channel 121 to the ejection port 152 through the channels 131 and 151, i.e., a path which supplies the powder flow 170 to the processing point 181. Also, let $R_2$ be the channel resistance of a path immediately before the powder flow 170 flows into the collection path 106 from the channel 121 through the channel 132, i.e., a path which does not supply the powder flow 170 to the processing point 181. In this case, $R_1$ and $R_2$ satisfy a relationship represented by:

$$R_1 \geq R_2 \tag{1}$$

That is, the flow resistance of the path which supplies the powder flow 170 to the processing point 181 is higher than that of the path which does not supply the powder flow 170 to the processing point 181.

Next, the operation of the processing nozzle 100 and the flowing of the powder flow 170 when the powder flow 170 is supplied to the processing point 181 will be explained. Note that the flow inlet and flow outlet of each channel are defined such that the upstream side of the flowing of the powder flow 170 is the flow inlet, and the downstream side is the flow outlet. As shown in FIG. 1, when the switch 104 rotates the part 102 and the channels 121 and 131 communicate with each other, the flow outlet of the channel 121 and the flow inlet of the channel 131 oppose each other.

When the powder flow 170 is supplied from the supply source 101 to the processing nozzle 100, the supplied powder flow 170 first enters the channel 121 from the flow inlet of the channel 121, passes through the channel 121, and reaches the flow outlet of the channel 121. The powder flow 170 having flowed out from the flow outlet of the channel 121 then enters the channel 131 from the flow inlet of the channel 131, passes through the channel 131, and reaches the flow outlet of the channel 131.

The powder flow 170 having reached the flow outlet of the channel 131 enters the channel 151 from the flow inlet of the channel 151, passes through the channel 151, and reaches the flow outlet of the channel 151. The powder flow 170 having reached the flow outlet of the channel 151 then enters the nozzle cone 105, passes through a slit (not shown) in the nozzle cone 105, and is supplied from the ejection port 152 to the processing point 181. The powder flow 170 ejected from the ejection port 152 converges to the processing point 181.

The flowing of the powder flow 170 when the powder flow 170 is collected in the collection pod from the collection path 106 will now be explained. As shown in FIG. 2, when the switch 104 rotates the part 102 and the channels 121 and 132 communicate with each other, the flow outlet of the channel 121 and the flow inlet of the channel 132 oppose each other.

When the powder flow 170 is supplied from the supply source 101 to the processing nozzle 100, the supplied powder flow 170 first enters the channel 121 from the flow inlet of the channel 121, passes through the channel 121, and reaches the flow outlet of the channel 121. The powder flow 170 having flowed out from the flow outlet of the channel 121 then enters the channel 132 from the flow inlet of the channel 132, passes through the channel 132, and reaches the flow outlet of the channel 132.

The powder flow 170 having reached the flow outlet of the channel 132 enters the collection path 106 from the flow inlet of the collection path 106, passes through the collection path 106, and reaches the flow outlet of the collection path 106. The powder flow 170 having reached the flow outlet of the collection path 106 then flows into the collection pod (not shown) and is collected in it. As described above, when the channels 121 and 132 communicate with each other, the powder flow 170 is not supplied to the nozzle cone 105 and hence is not ejected from the ejection port 152. This is a non-ejection state of the powder flow 170.

As described above, switching between ejection and non-ejection of the powder flow 170 from the ejection port 152 can be controlled by controlling the communication destination of the channel 121 by rotating the part 102. Also, since wasteful ejection of the powder flow 170 can be suppressed by thus performing control, the efficiency of powder utilization can be improved.

In addition, the part 102 is instantly rotated. Therefore, the powder flow 170 does not stop but keeps flowing even when switching, for example, the state in which the channels 121 and 131 communicate with each other to the state in which the channels 121 and 132 communicate with each other. Since the powder flow 170 keeps flowing, a time during which the powder flow 170 stays is very short, so the flow velocity of the powder flow 170 does not largely change. That is, it is possible to shorten a time during which the powder flow 170 is in a non-steady state, i.e., a time during which the flowing of the powder flow 170 becomes uneven and turbulence or the like occurs. This makes it possible to hold the flowing of the powder flow 170 in the steady state. Accordingly, it is possible to prevent deterioration of the powder convergence caused when the flowing of the powder flow 170 becomes a non-steady state.

It is possible to equalize the channel resistance ($R_1$) of the path extending from the channel 121 to the ejection port 152 through the channels 131 and 151, and the channel resistance (higher than $R_2$) of the path extending from the channel 121 to the collection pod (not shown) through the channel 132 and collection path 106. That is, it is possible to equalize the channel resistance of the whole channel when the channels 121 and 131 communicate with each other, and that of the whole channel when the channels 121 and 132 communicate with each other.

By thus equalizing the channel resistances of the whole channels, the flow velocity of the powder flow 170 when it is ejected and that of the powder flow 170 when it is not ejected can be equalized. When ejection and non-ejection of the powder flow 170 are switched, therefore, the change in flow velocity of the powder flow 170 can be suppressed, so it is possible to further reduce the time during which the flowing of the powder flow 170 is in the non-steady state. By equalizing the channel resistances of the whole channels as described above, it is possible to prevent deterioration of the powder convergence caused when the flowing of the powder flow 170 becomes the non-steady state.

It is possible to equalize the channel resistance of the whole channel when the powder flow 170 is ejected from the ejection port 152 and that of the whole channel when the powder flow 170 is not ejected as described above because expression (1) is satisfied. The channel resistance increases if the collection path 106 is connected to the nozzle cone 105. Therefore, the channel resistances cannot be equalized if expression (1) is not satisfied. That is, when expression (1) is satisfied, the channel resistances can be equalized, and deterioration of the powder convergence can be prevented.

This embodiment can maintain the steady state of the powder flow by shortening the time during which the steady state of the powder flow breaks, so the powder flow having a high powder convergence can be supplied to the processing point. Also, since ejection and non-ejection of the powder flow can appropriately be switched, it is possible to suppress wasteful ejection of the powder flow and improve the efficiency of powder utilization.

Second Embodiment

Figure 3:
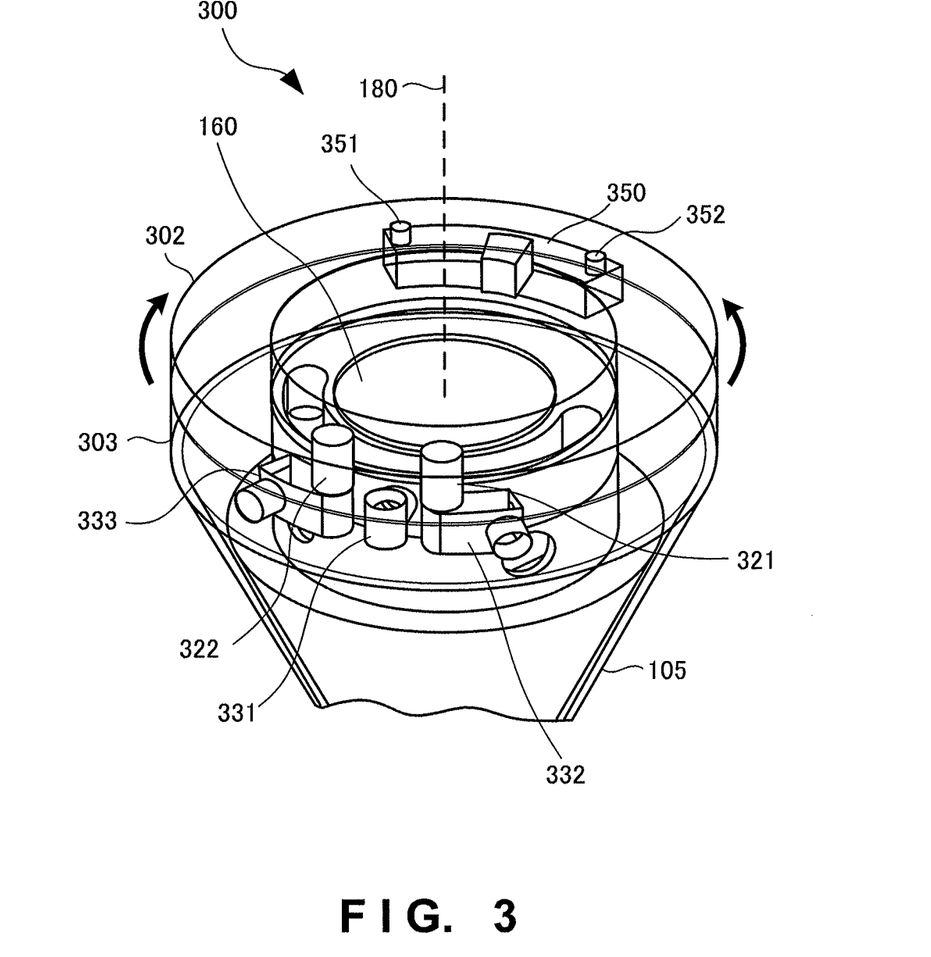
FIG. 3 is a schematic perspective view showing the arrangement of a processing nozzle according to the second embodiment of the present invention.

A processing nozzle according to the second embodiment of the present invention will be explained below with reference to FIGS. 3 and 4A to 4C. FIG. 3 is a view for explaining the arrangement of the processing nozzle according to this embodiment. The processing nozzle according to this embodiment differs from the aforementioned first embodiment in that two channels are formed in a part 302, two channels are formed in a part 303, and the nozzle includes a driver 350. The rest of the arrangement and the operation are the same as those the first embodiment, so the same reference numerals denote the same parts and the same operations, and a detailed explanation thereof will be omitted.

A processing nozzle 300 includes the part 302, part 303, and driver 350. The part 302 has a channel 321 (a first channel) and a channel 322 (a fourth channel), and the part 303 has a channel 331 (a second channel), a channel 332 (a third channel), and a channel 333 (a sixth channel). A powder flow 170 supplied from a supply source passes through the channels 321 and 322 of the part 302, and each powder flow 170 passing through one of these channels flows through one of the channels 331, 332, and 333 of the part 303. The channel 331 is connected to a channel formed in a nozzle cone 105 of the processing nozzle 300.

The driver 350 rotates the part 302. Consequently, the relative positions of the parts 302 and 303 can be changed (pivoted). The driver 350 has a pressurizing flow inlet 351 and a pressurizing flow inlet 352. A pressurizing fluid flows into the pressurizing flow inlets 351 and 352, thereby driving the driver 350 and rotating the part 302. The pressurizing fluid is a gas, oil, or the like, but is not limited to them. Also, the driver 350 is driven by a gas pressure or oil pressure. Since the driver 350 is driven by using the pressurizing fluid (by pressurization), the occurrence of an operation error can be suppressed even when a powder contained in the powder flow 170 enters the driver 350. Note that the driving method of the driver 350 is not limited to the method using a gas pressure or oil pressure, and may also be electrical control.

Figure 4A:
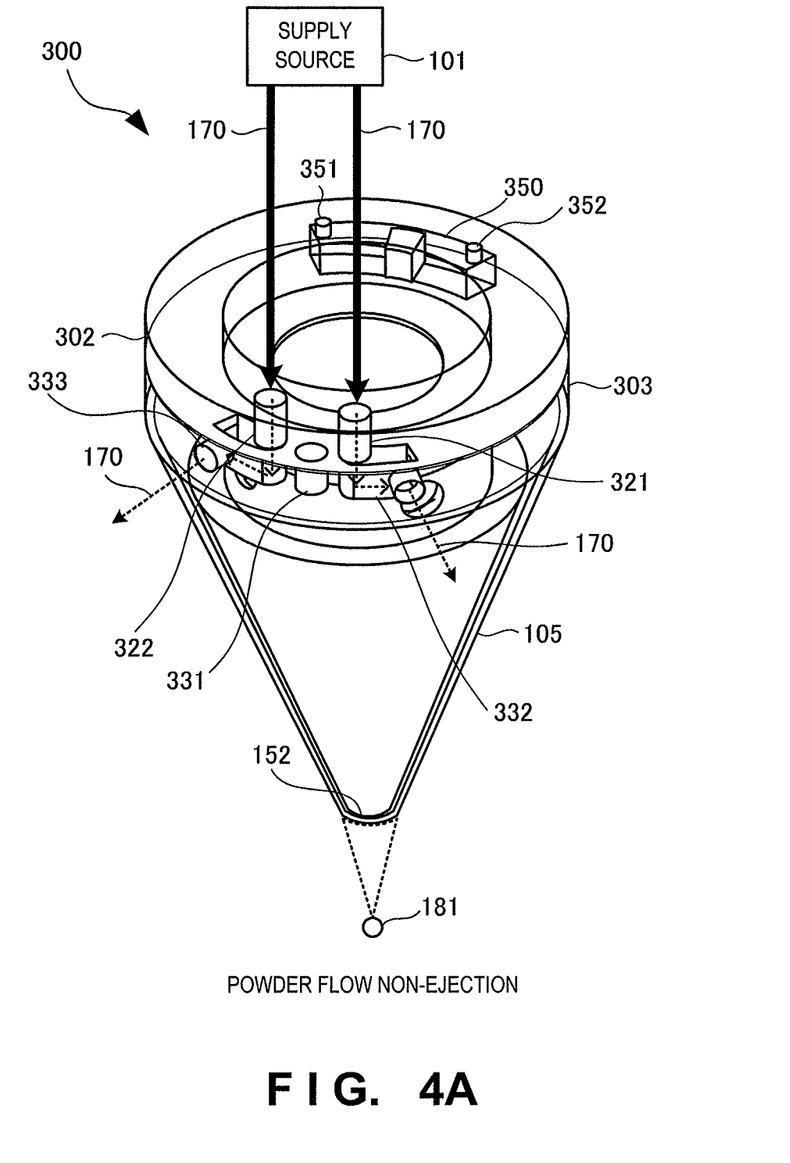
FIG. 4A is a view for explaining the flowing of a powder flow when the powder flow is not ejected from the processing nozzle according to the second embodiment of the present invention.
Figure 4B:
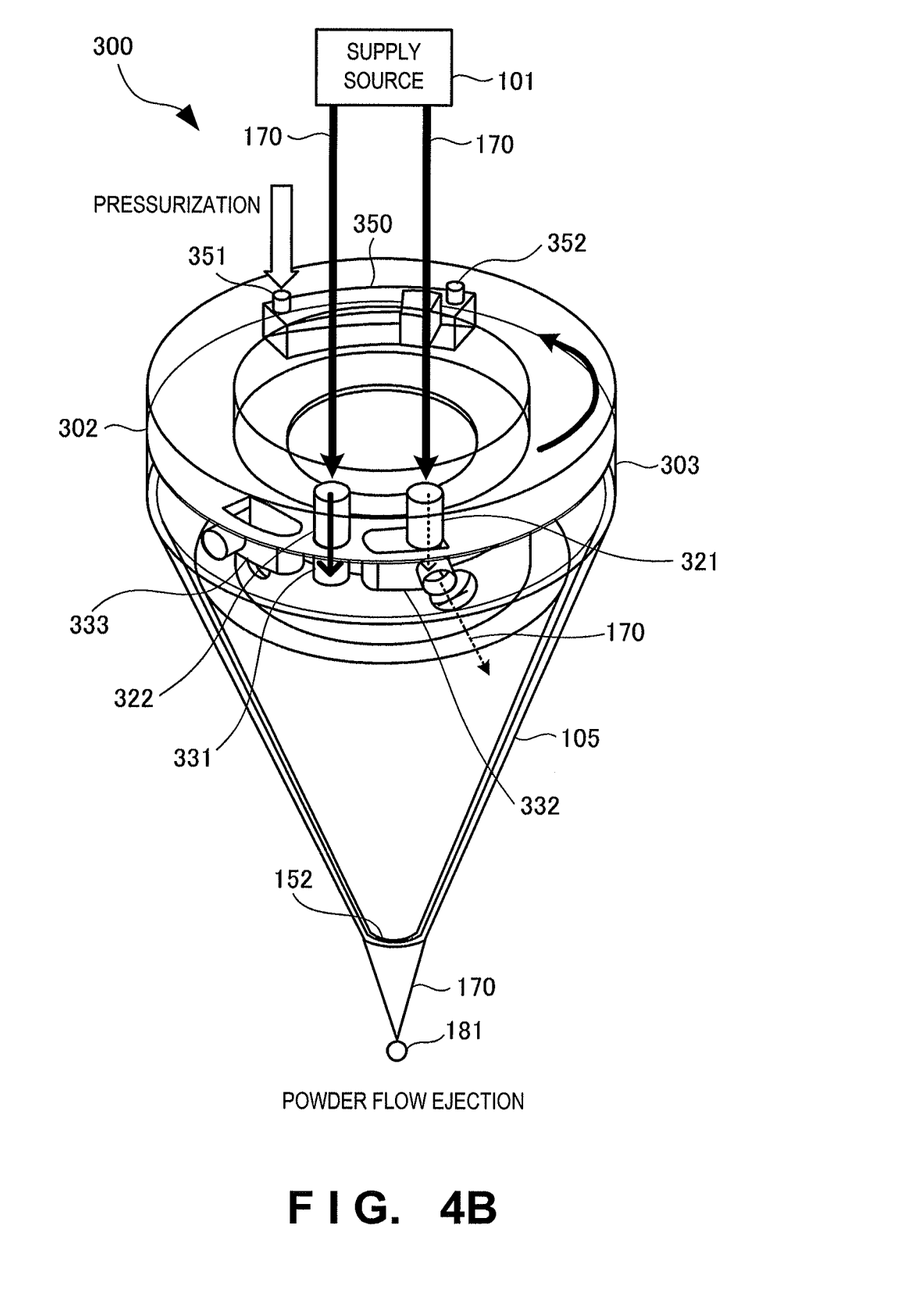
FIG. 4B is a view for explaining the flowing of the powder flow when the powder flow is ejected from the processing nozzle according to the second embodiment of the present invention.
Figure 4C:
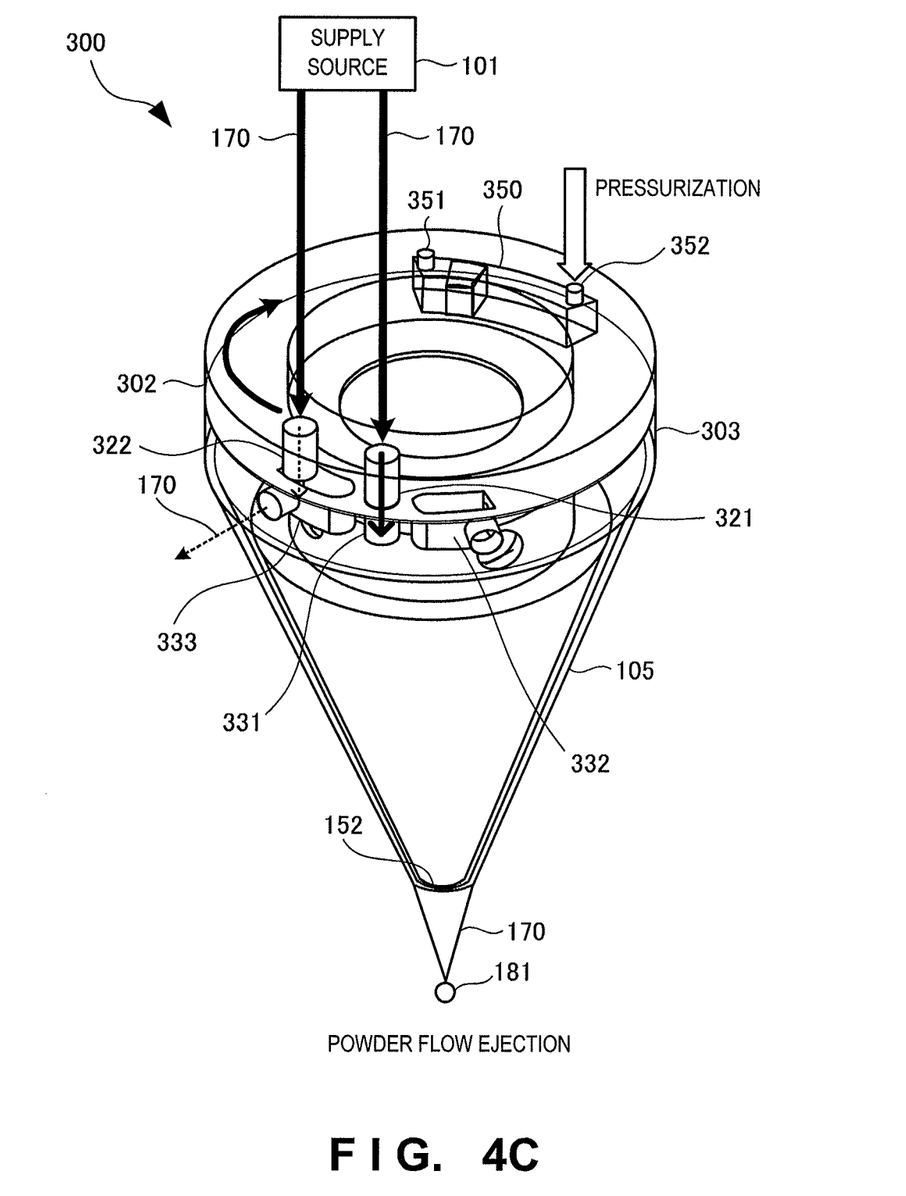
FIG. 4C is a view for explaining the flowing of the powder flow when the powder flow is ejected from the processing nozzle according to the second embodiment of the present invention.

Next, the operation of the processing nozzle 300 and the flowing of the powder flow 170 will be explained with reference to FIGS. 4A to 4C. FIG. 4A is a view for explaining the state of a case (powder flow non-ejection) in which the powder flow 170 is not ejected from the processing nozzle 300 according to this embodiment. FIGS. 4B and 4C are views each for explaining the state of a case (powder flow ejection) in which the powder flow 170 is ejected from the processing nozzle 300 according to this embodiment.

As shown in FIG. 4A, the powder flow 170 is not ejected from an ejection port 152 of the nozzle 300 in a state in which the channel 321 of the part 302 and the channel 332 of the part 303 oppose each other, and the channel 322 of the part 302 and the channel 333 of the part 303 oppose each other.

When the powder flows 170 are supplied from a supply source 101 to the processing nozzle 300, the supplied powder flows 170 first enter the channels 321 and 322 from the flow inlets of the channels 321 and 322, pass through the channels 321 and 322, and reach the flow outlets of the channels 321 and 322. The powder flows 170 having flowed out from the flow outlets of the channels 321 and 322 then enter the channels 332 and 333 from the flow inlets of the channels 332 and 333, pass through the channels 332 and 333, and reach the flow outlets of the channels 332 and 333.

The powder flows 170 having flowed out from the flow outlets of the channels 332 and 333 are collected in a collection pod or the like through a collection path (not shown). Accordingly, the powder flow 170 is not ejected from the ejection port 152 of the processing nozzle 300 to a processing point 181. This is a powder non-ejection state.

As shown in FIG. 4B, when pressurized driving is performed by supplying the pressurizing fluid from the pressurizing flow inlet 351, the part 302 is rotated counterclockwise, the channels 321 and 332 oppose each other, and the channels 322 and 331 oppose each other. In this state, the powder flow 170 supplied to the channel 322 is ejected from the ejection port 152 of the processing nozzle 300.

When the powder flows 170 are supplied from the supply source 101 to the processing nozzle 300, the supplied powder flows 170 are supplied to the channels 321 and 322.

Then, the powder flow 170 supplied to the channel 322 passes through the channel 322, flows into the channel 331 communicating with the channel 322, passes through the channel 331, and enters the nozzle cone 105. The powder flow 170 having entered the nozzle cone 105 is ejected from the ejection port 152 of the processing nozzle 300 to the processing point 181. Consequently, the powder flow 170 supplied to the channel 322 can be ejected from the ejection port 152.

On the other hand, the powder flow 170 supplied to the channel 321 passes through the channel 321, flows into the channel 332 communicating with the channel 321, passes through the channel 332, and is not supplied to the nozzle cone 105 but is collected in the collection pod (not shown) or the like. It is also possible to reuse the powder contained in the powder flow 170 collected in the collection pod.

As shown in FIG. 4C, when pressurized driving is performed by supplying the pressurizing fluid from the pressurizing flow inlet 352, the part 302 is rotated clockwise, the channels 321 and 331 oppose each other, and the channels 322 and 333 oppose each other. In this state, the powder flow 170 supplied to the channel 321 is ejected from the ejection port 152 of the processing nozzle 300.

When the powder flows 170 are supplied from the supply source 101 to the processing nozzle 300, the supplied powder flows 170 are supplied to the channels 321 and 322.

Then, the powder flow 170 supplied to the channel 321 passes through the channel 321, flows into the channel 331 communicating with the channel 321, passes through the channel 331, and enters the nozzle cone 105. The powder flow 170 having entered the nozzle cone 105 is ejected from the ejection port 152 of the processing nozzle 300 to the processing point 181. Consequently, the powder flow 170 supplied to the channel 321 can be ejected from the ejection port 152.

On the other hand, the powder flow 170 supplied to the channel 322 passes through the channel 322, flows into the channel 333 communicating with the channel 322, passes through the channel 333, and is not supplied to the nozzle cone 105 but is collected in the collection pod (not shown) or the like. It is also possible to reuse the powder contained in the powder flow 170 collected in the collection pod.

Note that both of the two powder flows 170 explained above can be a powder flow containing a powder as a material of a three-dimensional shaped object or the like, and one of them can also be a powderless flow (pure rare gas) containing no powder. Note also that the powders contained in the two powder flows 170 can be either the same powder or different powders. When the powders contained in the two powder flows 170 are different powders, two different types of materials can selectively be ejected.

When a powderless flow is used as one of the two powder flows 170 and a channel through which this powderless flow flows is opposed to the channel 331, the channel of the powder flow 170 in the nozzle cone 105 can be cleaned.

Note that in the above-described explanation, the channel 331 is a channel connected to the nozzle cone 105, and the channels 332 and 333 are channels connected to the collection path. However, these channels may also be switched. That is, the channel 331 may also be a channel connected to the collection path, and the channels 332 and 333 may also be channels connected to the nozzle cone 105.

In this embodiment, ejection and non-ejection of the powder flow can properly be switched. This makes it possible to suppress wasteful powder ejection, and improve the efficiency of powder utilization. In addition, a channel in the nozzle cone can be cleaned by supplying a powderless flow. Furthermore, the occurrence frequency of operation errors largely reduces because the driver is controlled by pressurization. When using different powders as the powders contained in the two powder flows 170, two different types of materials can selectively be ejected.

Third Embodiment

Figure 5A:
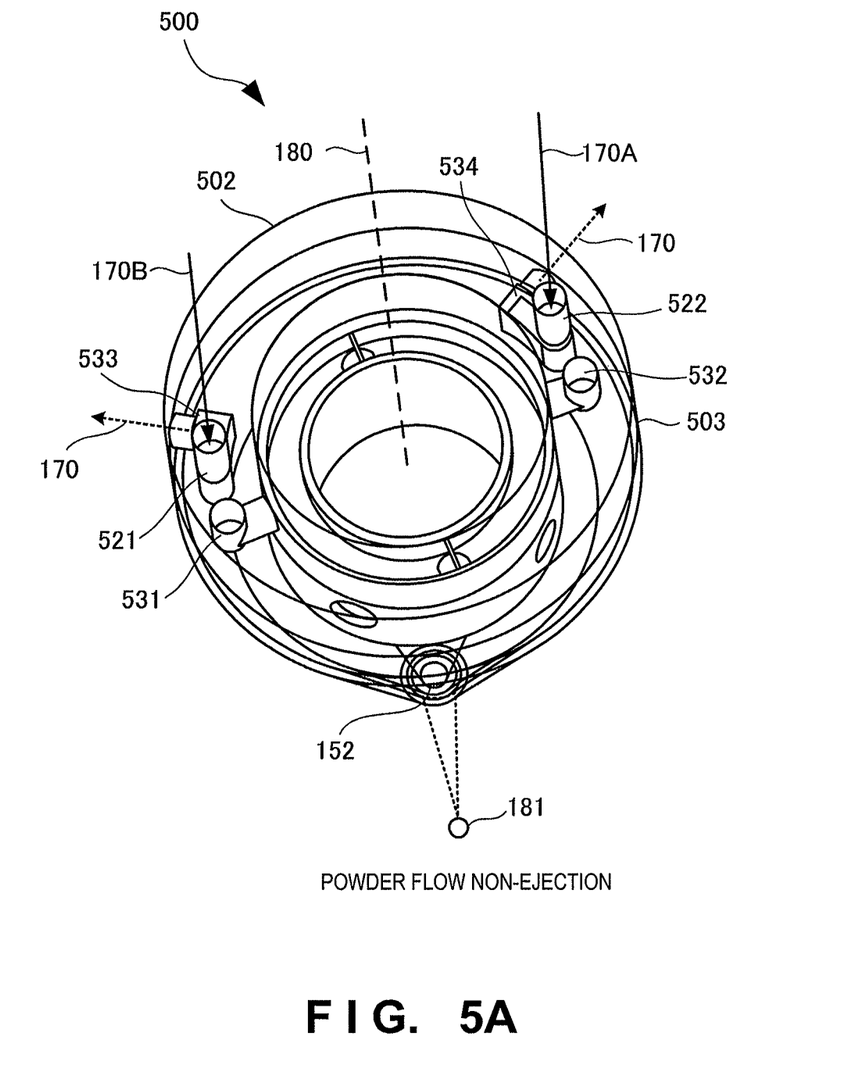
FIG. 5A is a view for explaining the arrangement of a processing nozzle according to the third embodiment of the present invention, and explaining the flowing of a powder flow when the powder flow is not ejected from the processing nozzle.
Figure 5B:
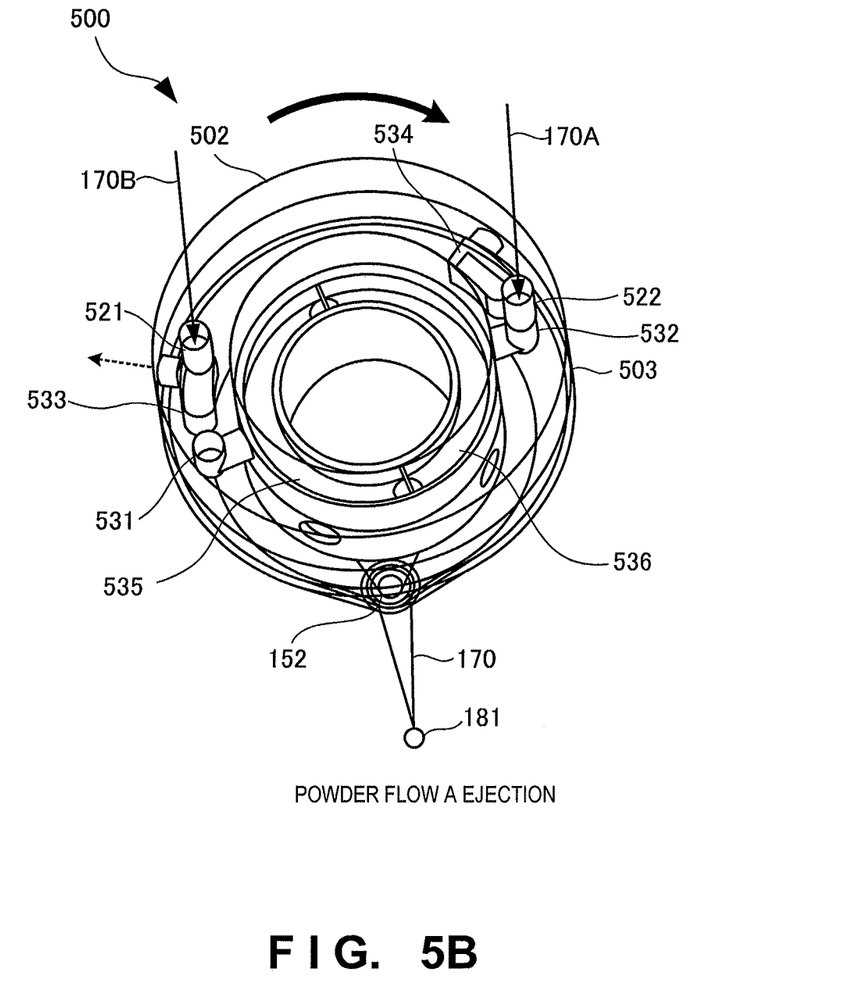
FIG. 5B is a view for explaining the arrangement of the processing nozzle according to the third embodiment of the present invention, and explaining the flowing of the powder flow when the powder flow is ejected from the processing nozzle.
Figure 5C:
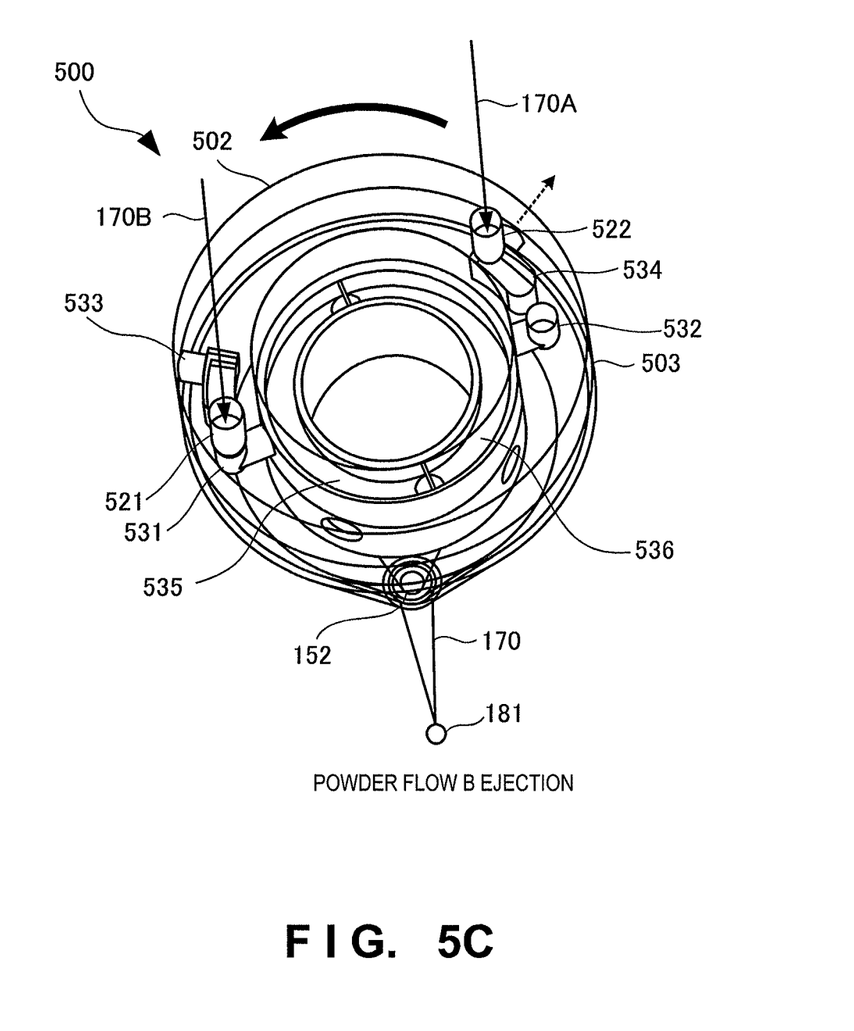
FIG. 5c is a view for explaining the arrangement of the processing nozzle according to the third embodiment of the present invention, and explaining the flowing of the powder flow when the powder flow is ejected from the processing nozzle.

A processing nozzle according to the third embodiment of the present invention will be explained below with reference to FIGS. 5A to 5C. FIG. 5A is a view for explaining the arrangement of the processing nozzle according to this embodiment, and explaining the flowing of a powder flow 170A and a powder flow 170B when the powder flows 170A and 170B are not ejected from the processing nozzle. FIGS. 5B and 5C are views each for explaining the arrangement of the processing nozzle according to this embodiment, and explaining the flowing of the powder flow 170A or 170B when the powder flow 170A or 170B is ejected from the processing nozzle. A processing nozzle 500 according to this embodiment differs from the abovementioned second embodiment in that the nozzle includes two channels connected to a nozzle cone. The rest of the arrangement and the operation are the same as those of the second embodiment, so the same reference numerals denote the same parts and the same operations, and a detailed explanation thereof will be omitted.

First, a case in which the powder flows 170A and 170B are not ejected from the processing nozzle 500 will be explained with reference to FIG. 5A. The processing nozzle 500 includes a part 502 and a part 503. The part 502 has a channel 521 and a channel 522, and the part 503 has a channel 531, a channel 532, a channel 533, and a channel 534. The channels 521 and 522 of the part 502 are in symmetrical positions. Likewise, the channels 531 and 533 and the channels 532 and 534 of the part 503 are in mirror-symmetrical positions with respect to a plane including a central axis 180. That is, the channel 521 of the part 502 and the pair of the channels 531 and 533 of the part 503 and the channel 522 of the part 502 and the pair of the channels 532 and 534 of the part 503 are in symmetrical positions.

As shown in FIG. 5A, the channel 521 and 533 communicate with each other, and the channels 522 and 534 communicate with each other. When the powder flows 170A and 170B are supplied from a supply source to the processing nozzle 500 in this state, the supplied powder flows 170A and 170B pass through the channels 521 and 522, and enter the channels 533 and 534. After that, the powder flows 170A and 170B are collected in a collection pod (not shown) or the like from the flow outlets of the channels 533 and 534.

Accordingly, the powder flows 170A and 170B are not ejected from an ejection port 152 of the processing nozzle 500.

Next, a case in which the powder flow 170A is ejected from the processing nozzle 500 will be explained with reference to FIG. 5B, and a case in which the powder flow 170B is ejected from the processing nozzle 500 will be explained with reference to FIG. 5C.

First, as shown in FIG. 5B, the part 502 is rotated clockwise by a driver (not shown), thereby causing the channels 522 and 532 to communicate with each other, and the channels 521 and 533 to communicate with each other. Consequently, the powder flow 170A having flowed into the channel 522 passes through the channel 522, and enters the channel 532 connected to a nozzle cone 105. Then, the powder flow 170A having entered the channel 532 passes through the channel 532, enters a path 536, flows through the path 536, passes through a slit formed in the nozzle cone 105, and is ejected from the ejection port 152.

On the other hand, the powder flow 170B having flowed into the channel 521 passes through the channel 521, and enters the channel 533 connected to the collection pod (not shown). Then, the powder flow 170B having entered the channel 533 is collected in the collection pod via a collection path or the like.

Similarly, as shown in FIG. 5C, the part 502 is rotated counterclockwise by the driver (not shown), thereby causing the channels 521 and 531 to communicate with each other, and the channels 522 and 534 to communicate with each other. Consequently, the powder flow 170B having flowed into the channel 521 passes through the channel 521, and enters the channel 531 connected to the nozzle cone 105. Then, the powder flow 170B having entered the channel 531 passes through the channel 531, enters a path 535, flows through the path 535, passes through the slit formed in the nozzle cone 105, and is ejected from the ejection port 152.

On the other hand, the powder flow 170A having flowed into the channel 522 passes through the channel 522, and enters the channel 534 connected to the collection pod (not shown). Then, the powder flow 170A having entered the channel 534 is collected in the collection pod via the collection path or the like.

The paths 535 and 536 are mirror-symmetrical with respect to the plane including the central axis 180 so that the channel resistances of channels to the ejection port 152 are equal, and include a partition along the plane. By thus making the channels to the ejection port 152 mirror-symmetrical with respect to the plane including the central axis 180, the channel resistances of the channels can be equalized. Consequently, the flow velocities of the powder flows 170A and 170B can be equalized when the powder flow 170B is ejected by using the path on the channel 521 side, and when the powder flow 170A is ejected by using the path of the channel 522 side. That is, when the two powder flows 170A and 170B are switched, it is possible to suppress changes in flow velocities of the powder flows 170A and 170B, and largely reduce a time during which the flowing of the powder flows 170A and 170B is in a non-steady state. This makes it possible to prevent deterioration of the powder convergence at a processing point 181, which is caused because the flowing of the powder flows 170A and 170B becomes the non-steady state. Furthermore, in this embodiment, the path through which the powder flow 170A enters the nozzle cone 105 and the path through which the powder flow 170B enters the nozzle cone 105 are independent of each other, so contamination by the powder in each path can be reduced.

Note that both of the two powder flows 170A and 170B explained above can be a powder flow containing a powder as a material of a three-dimensional shaped object or the like, and one of them can also be a powderless flow (pure rare gas) containing no powder. Note also that the powders contained in the two powder flows 170A and 170B can be either the same powder or different powders. When the powders contained in the two powder flows 170A and 170B are different powders, two different types of materials can selectively be ejected.

In this embodiment, it is possible to appropriately selectively eject the two powder flows by the above-described arrangement. Also, since the time during which the powder flow is in the non-steady state can be reduced, it is possible to prevent deterioration of the powder convergence, and supply a powder flow having a high powder convergence to the processing point. In addition, contamination of the channel by the powder can be reduced because the channels of the two powder flows are independent of each other.

Fourth Embodiment

Figure 6:
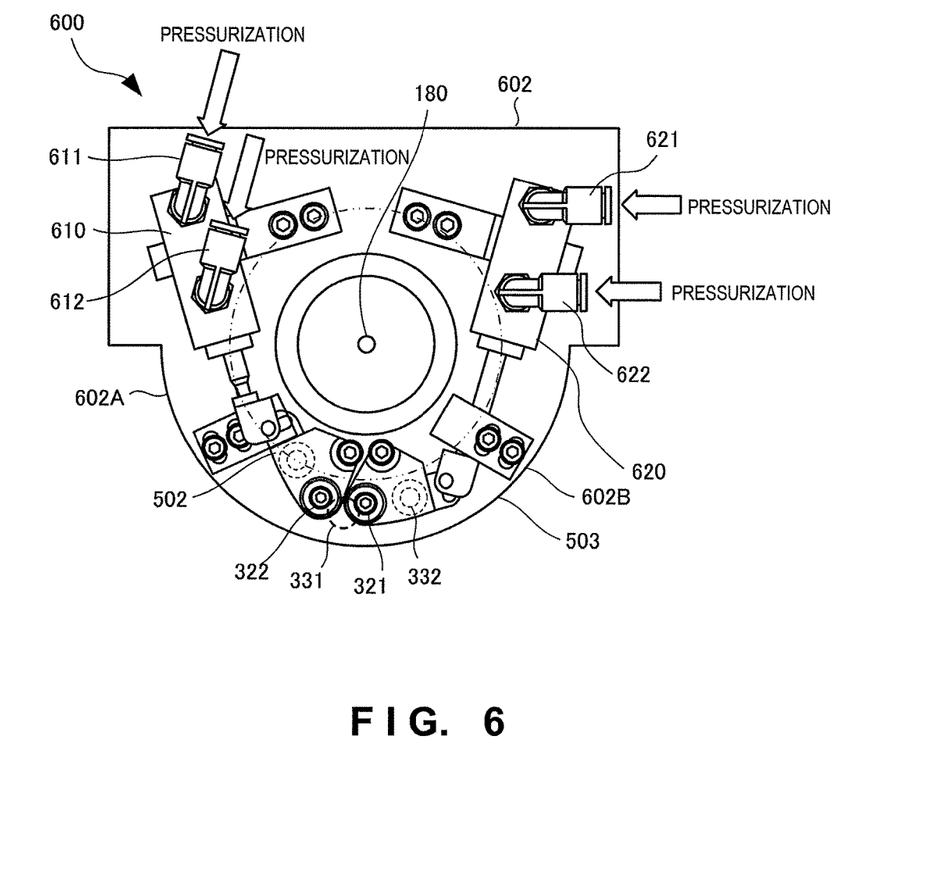
FIG. 6 is a view for explaining an example of the arrangement of a driver included in a processing nozzle according to the fourth embodiment of the present invention.

A driver included in a processing nozzle according to the fourth embodiment of the present invention will be explained below with reference to FIG. 6. FIG. 6 is a view for explaining an example of the arrangement of the driver included in the processing nozzle according to this embodiment. Note that the processing nozzle according to this embodiment has the same arrangement as that of the processing nozzle according to the second embodiment mentioned earlier, so an explanation thereof will properly be omitted.

A driver 600 includes two drivers 610 and 620. In this embodiment, a part 602 is divided into two parts, i.e., includes a part 602A and a part 602B. The drivers 610 and 620 respectively drive the parts 602A and 602B independently of each other.

The driver 610 includes a pressurizing flow inlet 611 and a pressurizing flow inlet 612, and the driver 620 includes a pressurizing flow inlet 621 and a pressurizing flow inlet 622. A pressurizing fluid flows into the pressurizing flow inlets 611, 612, 621, and 622, and drives the drivers 610 and 620 by a gas pressure or oil pressure, thereby independently rotating the parts 602A and 602B.

This arrangement can shorten the driving distance of the drivers 610 and 620, and increase the driving speed. That is, this makes it possible to shorten a time during which the powder flow is in a non-steady state when the parts 602A and 602B are driven, and prevent deterioration of the powder convergence caused when the powder flow is in the non-steady state.

Fifth Embodiment

Figure 7:
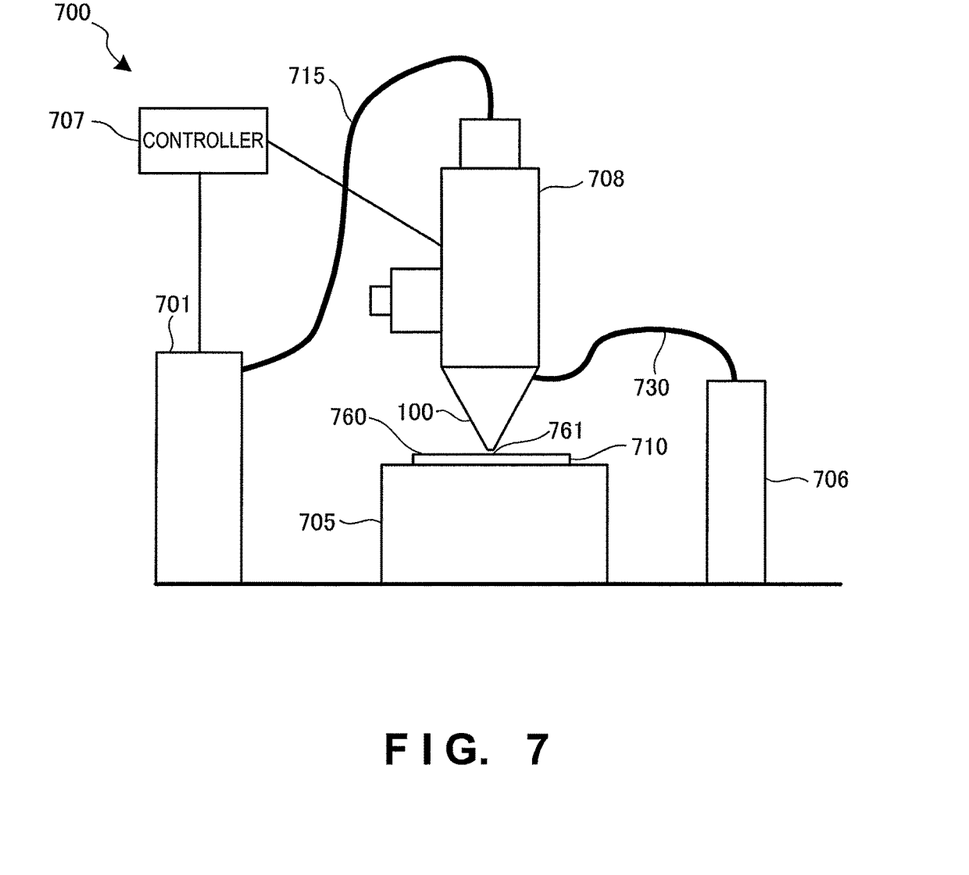
FIG. 7 is a view for explaining the arrangement of an optical machining apparatus according to the fifth embodiment of the present invention.

An optical machining apparatus according to the fifth embodiment of the present invention will be explained below with reference to FIG. 7. FIG. 7 is a view for explaining the arrangement of an optical machining apparatus 700 according to this embodiment. The optical machining apparatus 700 is an apparatus that includes one of the processing nozzles 100, 300, and 500 explained in the above-described embodiments, and forms a three-dimensional shaped object or performs overlay welding by melting a material contained in a powder flow by heat generated by condensed light. In this embodiment, the optical machining apparatus 700 including the processing nozzle 100 will be explained as an example.

<<Apparatus Arrangement>>

The optical machining apparatus 700 includes a light source 701, a light transmitter 715, a stage 705, a material storage device 706, a material supplier 730, a processing head 708, and a controller 707.

The light source 701 is a laser source here, but can be an LED (Light Emitting Diode), a halogen lamp, or xenon lamp. The light beam to be used to melt a material is not limited to the laser beam, and can be any light beam as long as the light beam can melt a powder material at a processing point. For example, the light beam may be an electromagnetic wave from the infrared range to the ultraviolet range.

The light transmitter 715 is, for example, an optical fiber having a core diameter of φ0.01 to 1 mm, and guides light generated by the light source 701 to the processing head 708.

The material storage device 706 supplies a material-containing carrier gas to the processing head 708 via the material supplier 730. The material is, for example, a particle such as a metal particle or a resin particle. The carrier gas is an inert gas and can be, for example, argon gas, nitrogen gas, or helium gas.

The material supplier 730 is, for example, a resin or metal hose, and guides, to the processing head 708, a powder flow prepared by mixing a material in a carrier gas. Note that the carrier gas is unnecessary if the material is a wire.

The processing head 708 incorporates a condensing device that condenses light serving as the light beam. The processing nozzle 100 is attached downstream of the condensing device. A laser beam supplied to the processing head 708 is adjusted to be condensed on a process surface 760 through an optical system formed from a lens provided inside and the like. The laser beam irradiates the process surface 760 through the inside of the processing nozzle 100. The optical system is provided to be able to control the condensing position by controlling the lens interval or the like.

The controller 707 receives a shaping condition such as fine writing or bold writing, changes the output value of a laser beam from the light source 701 in accordance with the received shaping condition, and slides the outer housing of the processing nozzle 100. By this processing, the controller 707 controls the powder spot diameter of a powder to be ejected from the processing nozzle 100 in accordance with the molten pool diameter.

<<Apparatus Operation>>

Next, the operation of the optical machining apparatus 700 will be explained. A shaped object 710 is created on the stage 705. Light emitted by the processing head 708 is condensed to the process surface 760 on the shaped object 710. The temperature of the process surface 760 is raised by the condensed light, and the process surface 760 is melted, partially forming a molten pool 761.

The material is ejected from the processing nozzle 100 to the molten pool 761 of the process surface 760. The material is melted into the molten pool 761. After that, the molten pool 761 is cooled and hardened to deposit the material on the process surface 760, implementing three-dimensional shaping.

In this embodiment, highly accurate optical machining can be performed because the processing nozzle having a high powder convergence is used.

OTHER EMBODIMENTS

The present invention has been explained above with reference to the embodiments. However, the present invention is not limited to those embodiments. Various changes understandable by those skilled in the art within the scope of the present invention can be made for the arrangements and details of the present invention. The present invention also incorporates a system or apparatus that somehow combines different features included in the respective embodiments.

The invention claimed is:

1. A processing nozzle comprising:
   a supply source which is capable of supplying a first fluid;
   a first channel through which the first fluid supplied from said supply source passes;
   a second and fifth channel that supplies the first fluid to an ejection port of the nozzle;
   a third channel that releases the first fluid outside the nozzle; and
   a switch that causes said first channel and said second channel to communicate with each other when supplying the first fluid to said ejection port, and causes said first channel and said third channel to communicate with each other when not supplying the first fluid to said ejection port, wherein
   said supply source is further capable of supplying a second fluid, and
   the processing nozzle further includes:
   a fourth channel through which the second fluid supplied from said supply source passes; and
   a sixth channel that releases the second fluid outside the nozzle, and
   said switch causes said first channel and said second channel to communicate with each other, and said fourth channel and said sixth channel to communicate with each other, when supplying the second fluid from said first channel to said ejection port, and
   causes said fourth channel and said second channel to communicate with each other, and said first channel and said third channel to communicate with each other, when supplying the second fluid from said fourth channel to said ejection port.

2. The processing nozzle according to claim 1, wherein at least one of the first and second fluids contains a powder.

3. The processing nozzle according to claim 1, wherein said first fluid includes a first powder and said second fluid includes a second powder different form the first powder.

4. The processing nozzle according to claim 1, wherein a channel resistance of said third channel is lower than that from said second channel to said ejection port.

5. The processing nozzle according to claim 1, further comprising a collector that is connected to said third channel and collects the first fluid,
   wherein a channel resistance from said third channel to said collector is equal to that from said second channel to said ejection port.

6. An optical machining apparatus comprising said processing nozzle according to claim 1.

7. The processing nozzle according to claim 1, wherein a bottom portion of the processing nozzle comprises sloped walls that taper gradually toward the ejection port so that the first fluid and the second fluid ejected from the ejection port converges to a processing point.

8. A processing nozzle comprising:
   a supply source which is capable of supplying a first fluid;
   a first channel through which the first fluid supplied from said supply source passes;
   a second channel that supplies the first fluid to an ejection port of the nozzle;
   a third channel that releases the first fluid outside the nozzle; and a switch that causes said first channel and said second channel to communicate with each other when supplying the first fluid to said ejection port, and causes said first channel and said third channel to communicate with each other when not supplying the first fluid to said ejection port, wherein said supply source is further capable of supplying a second fluid, and the processing nozzle further includes:

a fourth channel through which the second fluid supplied from said supply source passes;

a fifth channel that supplies the second fluid to said ejection port; and a sixth channel that releases the second fluid outside the nozzle, and said switch causes said first channel and said second channel to communicate with each other, and said fourth channel and said sixth channel to communicate with each other, when supplying the second fluid from said first channel to said ejection port, and causes said fourth channel and said fifth channel to communicate with each other, and said first channel and said third channel to communicate with each other, when supplying the second fluid from said fourth channel to said ejection port.

9. The processing nozzle according to claim 8, further comprising a beam path that passes a light beam from a light source, wherein said second channel and said fifth channel are arranged to be mirror-symmetrical with respect to a plane including a central axis of said beam path.

10. An optical machining apparatus comprising the processing nozzle according to claim 8.

11. The processing nozzle according to claim 8, wherein a bottom portion of the processing nozzle comprises sloped walls that taper gradually toward the ejection port so that the first fluid and the second fluid ejected from the ejection port converges to a processing point.

* * * * *